United States Patent
Fot et al.

(10) Patent No.: US 8,321,909 B2
(45) Date of Patent: *Nov. 27, 2012

(54) IDENTITY MEDIATION IN ENTERPRISE SERVICE BUS

(75) Inventors: Dmitriy Fot, Kazakhstan (DE); Ivan Milman, Austin, TX (US); Martin Oberhofer, Kazakhstan (DE)

(73) Assignee: International Business Machines Corporation, Armonk, NY (US)

( * ) Notice: Subject to any disclaimer, the term of this patent is extended or adjusted under 35 U.S.C. 154(b) by 331 days.

This patent is subject to a terminal disclaimer.

(21) Appl. No.: 12/644,072

(22) Filed: Dec. 22, 2009

(65) Prior Publication Data

US 2011/0154435 A1    Jun. 23, 2011

(51) Int. Cl.
*H04L 29/06* (2006.01)
(52) U.S. Cl. ................................. 726/1; 726/5
(58) Field of Classification Search .................. 726/1, 3, 726/4; 713/160, 161, 170
See application file for complete search history.

(56) References Cited

U.S. PATENT DOCUMENTS

| | | | |
|---|---|---|---|
| 6,295,548 B1 * | 9/2001 | Klein et al. | 718/101 |
| 7,493,518 B2 | 2/2009 | Anderson et al. | |
| 7,650,383 B2 * | 1/2010 | Logue et al. | 709/206 |
| 7,748,046 B2 * | 6/2010 | Johnson et al. | 726/27 |
| 2005/0223413 A1 * | 10/2005 | Duggan et al. | 726/3 |
| 2008/0069082 A1 | 3/2008 | Patrick et al. | |
| 2008/0120380 A1 | 5/2008 | Boyd et al. | |
| 2008/0140759 A1 | 6/2008 | Conner et al. | |
| 2009/0019421 A1 | 1/2009 | Barcia et al. | |

OTHER PUBLICATIONS

Sliman-et al.; "Single sign-on integration in a distributed enterprise service bus"; INSPEC/IEEE; 2009.
IBM-; "Implicit transcoding in an Enterprise Service Bus"; IP.COM/IBM TDB; Jun. 29, 2007.
IBM-; "Migration qualifier for intermediary logic in an Enterprise Service Bus"; IP.COM/IBM TDB; Jan. 10, 2007.
Srirama-et al.; "Mobile Web Services Mediation Framework"; ACM Digital Library; pp. 6-16; Nov. 26, 2007.
Liu-et al.; "Eucalyptus: A Web Service-Enabled E-Infrastructure"; ACM Digital Library: pp. 1-10, 2007.

\* cited by examiner

*Primary Examiner* — Ali Abyaneh
(74) *Attorney, Agent, or Firm* — Garg Law Firm, PLLC; Rakesh Garg; Libby Z. Toub

(57) ABSTRACT

A system, and computer usable program product for identity mediation in an enterprise service bus are provided in the illustrative embodiments. A security information is received at the enterprise service bus from a first application executing in a first data processing system. The security information is a part of a request for service from a second application executing in a second data processing system. A part of the security information is identified to be transformed such that the part upon transformation is usable for handling the request by the second application. A security policy applicable to the identified part is selected and the identified part is transformed according to the security policy. The transforming results in a transformed security information. The transformed security information is sent to the second application.

15 Claims, 9 Drawing Sheets

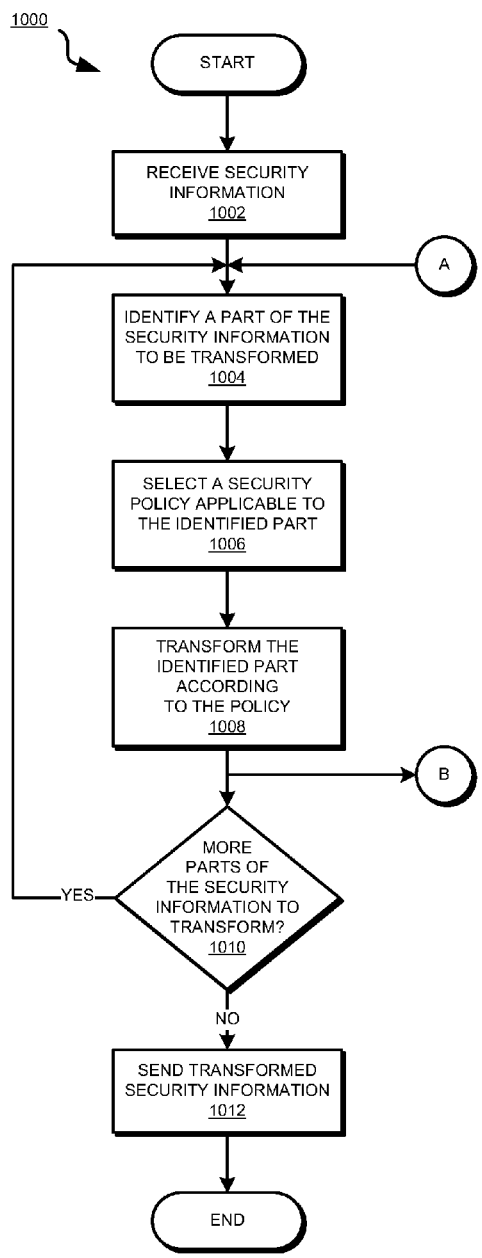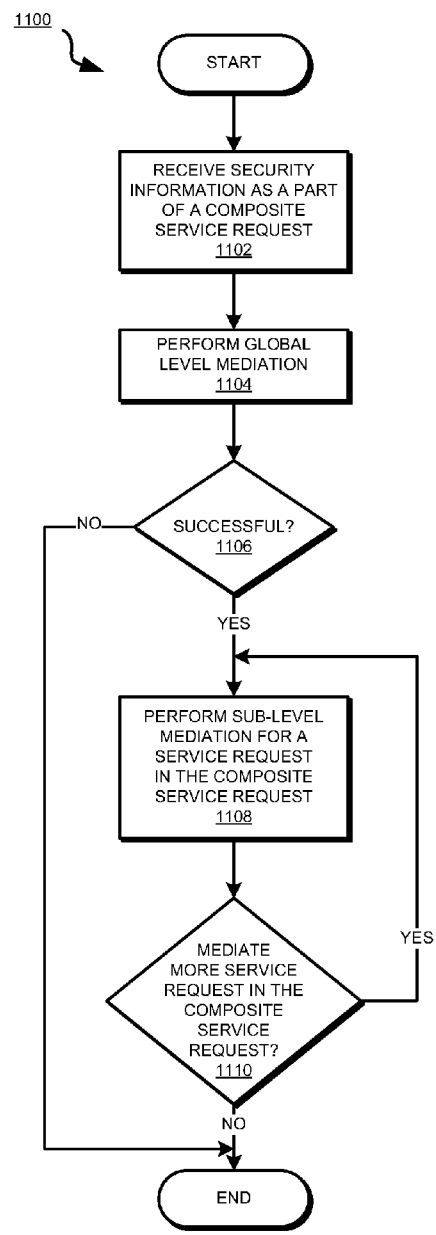

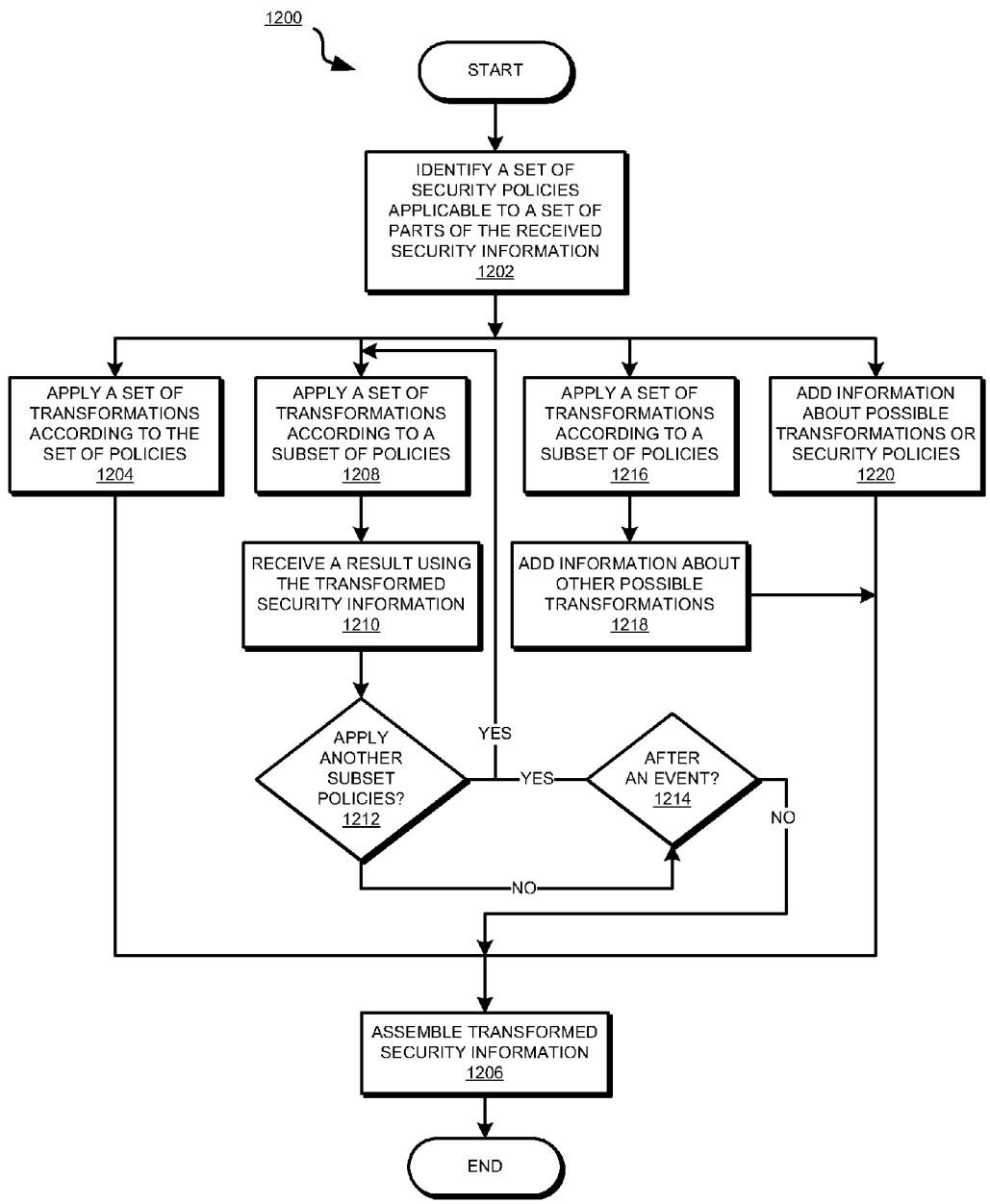

IDENTITY MEDIATION IN ENTERPRISE SERVICE BUS

BACKGROUND OF THE INVENTION

1. Field of the Invention

The present invention relates generally to an improved data processing system, and in particular, to securely providing services over a data network. Still more particularly, the present invention relates to a system, and computer usable program code for identity mediation in an enterprise service bus (ESB).

2. Description of the Related Art

Data is frequently exchanged between applications executing on various data processing systems using one or more data networks. Some data networks may be regarded as public networks, such as wide area networks accessing the Internet. Other data networks may be private networks, such as local area networks, and virtual private networks (VPNs).

A data processing system situated in a public network may communicate with a data processing system situated in a private network through a variety of devices and applications. Such communications may cause an exchange of data between any combination of applications executing in public and private networks.

Applications exchanging data in this manner may be implemented using a variety of technologies. Typical system architectures found in many enterprises today are configured based on a service consumer—service provider model. Service provider applications provide functions, operations, or services to service consumer applications. Generally, the service provider and the service consumer applications communicate with each other by using an Interconnectivity and Interoperability (IIOP) layer known as enterprise service bus.

Some of the service consumer applications may be internal applications. An application is internal when the application is owned by the enterprise. An internal application may be one or more copies of one or more licensed products owned by an organization associated with the enterprise. An enterprise is a data processing environment within a private network. An application is owned by an enterprise when the application executes within the private network.

An application is external when the application is not owned by the enterprise. Generally, an external application executed on a data processing system outside the enterprise firewall.

External applications may be deployed, updated, managed, and secured under the control of an external organization. Internal applications can be service providers or service consumers or both in particular implementations. External applications can also be service providers or service consumers or both in particular implementations.

Security of the data, the systems the data resides on, and the networks where the systems operate, is a concern in data communications. Internal and external service consumer and service provider applications have to communicate with each other such that data security implementations can provide the desired level of security, while not adversely affecting performance or complexity beyond a certain level.

SUMMARY OF THE INVENTION

The illustrative embodiments provide a system, and computer usable program product for identity mediation in enterprise service bus. According to the invention, an embodiment receives a security information at the enterprise service bus from a first application executing in a first data processing system. The security information is a part of a request for service from a second application executing in a second data processing system. The embodiment identifies a part of the security information to be transformed such that the part upon transformation is usable for handling the request by the second application. The embodiment selects a security policy applicable to the identified part and transforms the identified part according to the security policy. The transforming results in a transformed security information. The embodiment sends the transformed security information to the second application. The identification, the selection, and the transformation steps occur in the enterprise service bus.

In another embodiment, the security information includes several parts. A part in those several parts contains information usable for authenticating a sender of the request. Another part in those several parts contains information usable for determining authorization of the sender.

In another embodiment, a set of security policies are applicable to transform a set of parts of the security information. A first subset of security policies is applicable to a first subset of parts and a second subset of security policies is applicable to a second subset of parts.

In another embodiment, the first subset of security policies is applied to the first subset of parts at a first time. The second subset of security policies is applied to the second subset of parts at a second time.

In another embodiment, the first subset of security policies is applied to the first subset of parts in the enterprise service bus. The second subset of security policies is applied to the second subset of parts in the second application.

In another embodiment, the first subset of security policies is applied to the first subset of parts. Information associated with the second subset of security policies is added to the security information.

In another embodiment, the request is a composite service request. The composite service request has a first security information at the global level and a second security information at a sub-level.

In another embodiment, a transformation of a part of the second security information occurs upon a successful transformation of a part of the first security information. In another embodiment, the transformation of the part of the second security information occurs at the second application.

In another embodiment, the transforming includes validating the part of the security information. In another embodiment, a combination of the identifying, the selecting, and the transforming is performed using a resource accessible from a third data processing system where the enterprise service bus is executing.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 10 depicts a flowchart of a process of mediating security information in accordance with an illustrative embodiment;

FIG. 11 depicts a flowchart of a process of mediating identities in composite service requests in accordance with an illustrative embodiment; and FIG. 12 depicts a flowchart of a process of applying security policies in identity mediation in accordance with an illustrative embodiment.

DETAILED DESCRIPTION OF THE PREFERRED EMBODIMENT

Figure 1:
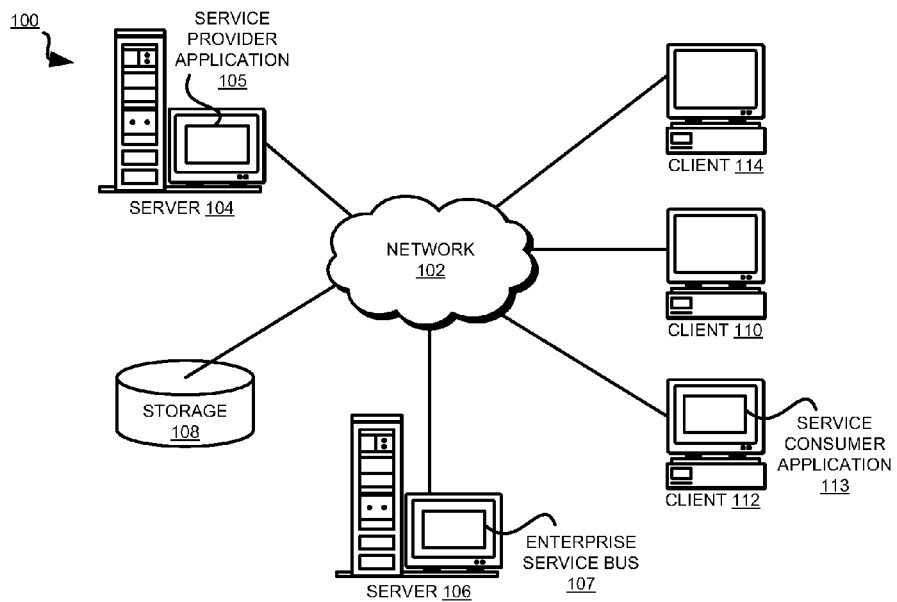
FIG. 1 depicts a pictorial representation of a network of data processing systems in which illustrative embodiments may be implemented.

An enterprise service bus within the scope of the invention facilitates messaging and communication between service provider and service consumer applications for using the services offered by the service provider applications. Generally, an enterprise service bus within the scope of the invention can be any mechanism, communication configuration, system, application, or a combination thereof to facilitate data communication between two applications for this purpose.

In requesting a service from a service provider application, a service consumer application may have to authenticate itself to the service provider application. Additionally, the service consumer application may also have to authenticate a user who is trying to use the service provider application through the service consumer application. Typically, authentication of an application or a user is performed by presenting some identifying information, or identity, that relates to the application or the user.

Internal applications are typically configured, managed, and operated within the control of an enterprise. External applications are typically configured, managed, and operated outside the control of the enterprise. The invention recognizes that due to the lack of control on the external applications, internal and external service consumer and service provider applications can suffer from mismatches in application connectivity, application request formats, and security implementations.

To minimize the chances of such a mismatch, implementations of internal and external applications attempt to conform to certain standards of implementation. For example, a standard exists for implementing web services (WS) using Simple Object Access Protocol (SOAP).

In a WS environment a service consumer application and a service provider application may implement a specific version of WS-Security standards. As an example, a service consumer application may send a message to a service provider application on behalf of a user requesting a service. According to a chosen implemented standard, authentication information, authorization information, any other type of identity information about the service consumer application, and any identity that is being asserted by the consumer application on behalf of a user may be put into a set of secure tokens embedded into the SOAP Header of the message.

A token is a data structure defined to contain data usable for a specific purpose, such as authentication. A secure token is a token that includes a security measure to protect the data therein, and may also contain information describing a method of using the data. A set of tokens is one or more tokens. A set of secure tokens is one or more secure tokens.

However, the invention recognizes that this approach suffers from certain limitations. For example, few secure token types exist that support service consumer applications forwarding identity assertions about end users from outside the enterprise. Furthermore, even these tokens are not widely deployed outside enterprise boundaries.

As another example of a limitation of standards based implementations, the invention recognizes that often, service provider applications rely on attributes and identity assertions that are not typically known to external identity providers, but are known to the service consumer applications. An external identity provider is a third party system for validating identity information, such as a certificate authority (CA). Some examples of attributes not known to external identity providers but know to specific service consumer applications are credit limits and relationship between users.

Some implementations use certain work-around solutions to overcome these types of limitations of standards based implementations. For example, some service provider applications use two layers of security. A service provider application may authenticate a service consumer application using the web services layer and may determine authorization of a user based on assertions about the user from the service consumer application and an external identity provider.

The invention further recognizes that, even these solutions have limitations. For example, a service consumer application must know which specific identity and authorization attributes can be used inside the enterprise of the service provider application. However, providing this knowledge can lead to information leakage and spoofing attacks. For example, a service consumer application may assert an identity of a highly privileged user, such as a system administrator.

As another example limitation, the invention recognizes that inserting identity and authorization information into multiple parts of a message is complex and error prone. The invention further recognizes that implementing the standards based approach or the work-around solutions leads to a lack of flexibility of the security infrastructure. As an example, the requirements for identity and authorization information can change at the service provider application. For example, introduction of a new or changed authorization attribute would change the SOAP Body structure and the caller of the service might not work anymore. Similarly, removal of an authorization attribute might not be compatible with a service consumer application's configuration, leading again to failed communication between the service consumer and provider applications.

The invention further recognizes that even for internal applications communicating with each other, the tight coupling regarding authentication and authorization attributes is not desirable. Tight coupling between applications exists when the applications have to interact with each other following strict conformance to predefined structures.

For example, the invention recognizes that tight coupling between internal applications leaves them susceptible to insider attacks from persons with knowledge. The invention further recognizes that tight coupling also leads to lack of flexibility. For example, if security authorization attributes change, even internal service consumer applications have to be modified for the continuity of service.

Identity management systems exist that can map identity attributes as needed. However, the invention further recognizes that deployment of such systems is expensive, cumbersome, management intensive, and introduces additional systems in a data processing environment. The invention recognizes that mapping identities inside an enterprise service bus would be desirable to address these and other related problems. However, the invention also recognizes that present enterprise service bus technologies do not offer the needed tooling for performing such mappings within the enterprise service bus.

The illustrative embodiments used to describe the invention generally address and solve the above-described problems and other problems related to identity management, authentication, and authorization for using service applications. The illustrative embodiments provide a computer usable program product, and data processing system for identity mediation in enterprise service bus.

The illustrative embodiments are described with respect to certain documents, messages, data, data structures, file systems, fine names, directories, and paths only as examples. Such descriptions are not intended to be limiting on the invention. For example, an illustrative embodiment described with respect to a message using a particular protocol may be implemented with respect to a message using a different protocol in a similar manner within the scope of the invention.

The illustrative embodiments are further described with respect to certain applications only as examples. Such descriptions are not intended to be limiting on the invention. An embodiment of the invention may be implemented with respect to any type of application, such as, for example, any type of server application, platform application, stand-alone application, or a combination thereof.

Application may further include data objects, code objects, encapsulated instructions, application fragments, services, and other types of resources available in a data processing environment. For example, Java® object, an Enterprise Java Bean (EJB®), a servlet, or an applet may be manifestations of an application with respect to which, within which, or using which, the invention may be implemented. (Java, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular software tools and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
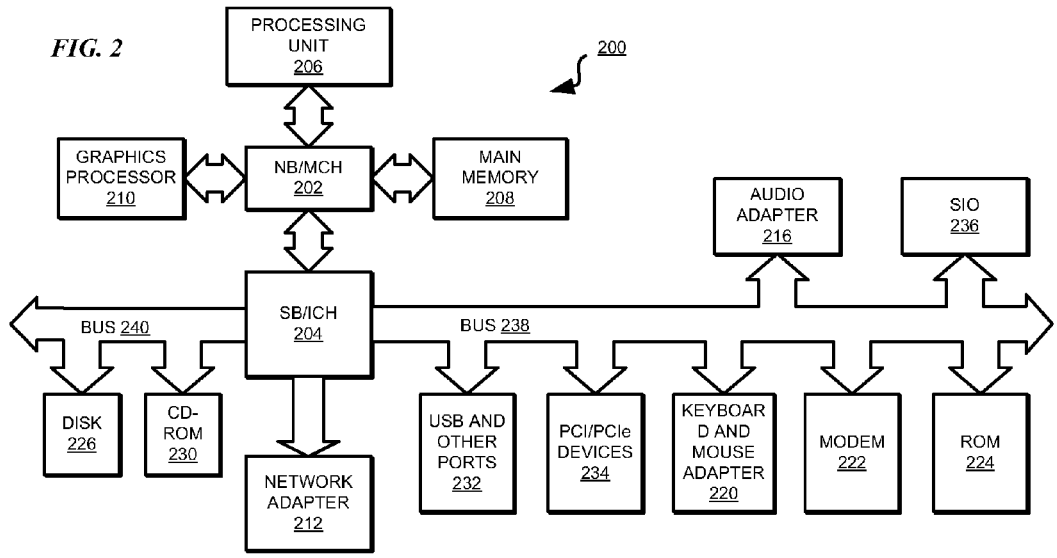
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include service provider application 105. Service provider application 105 may be any application operable to provide any type of service. Server 106 may include enterprise service bus 107. Client 112 may include service consumer application 113. Service consumer application 113 may be any application operable to use a service provided by a service provider application, such as service provider application 105.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
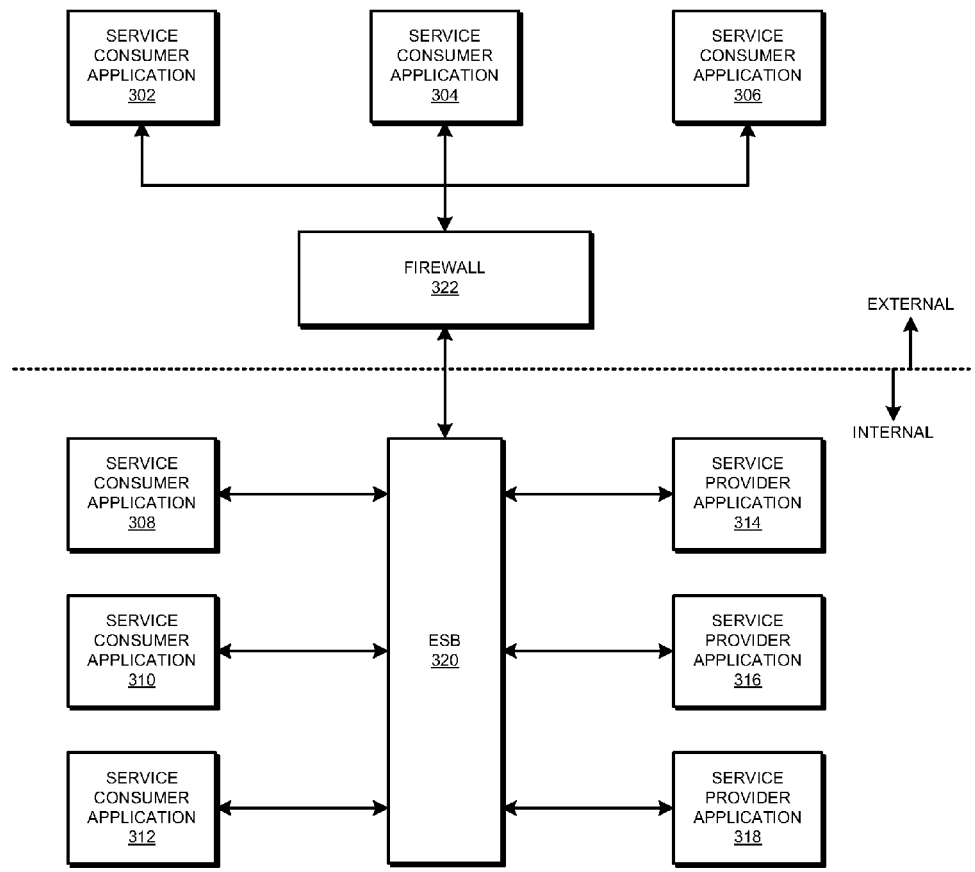
FIG. 3 depicts a block diagram of a configuration of internal and external service consumer and service provider applications with respect to which an illustrative embodiment may be implemented.

With reference to FIG. 3, this figure depicts a block diagram of a configuration of internal and external service consumer and service provider applications with respect to which an illustrative embodiment may be implemented. Any of service consumer applications 302, 304, 306, 308, 310, and 312 may be implemented using service consumer application 113 in FIG. 1. Any of service provider applications 314, 316, and 318 may be implemented using service provider application 105 in FIG. 1. Enterprise service bus 320 may be implemented using enterprise service bus 107 in FIG. 1. Firewall 322 may be a hardware firewall apparatus, a software firewall application, or a combination thereof to screen data traffic flowing between internal and external applications.

A service consumer application, whether an internal or an external application, may communicate with one or more service provider application in order to avail a service offered by the one or more service provider applications. Conversely, a service provider application may communicate with one or more service consumer applications to provide a service.

As an example, service consumer application 302 and service provider application 314 may communicate with each other by directing data through firewall 322 and enterprise service bus 320. Service consumer application 302 is depicted as being an external application. Service provider application 314 is depicted as an internal application.

Service consumer application 308 is depicted as an internal service consumer application. Service consumer application 308 and service provider application 314 may communicate with each other by directing data through enterprise service bus 320.

The communications between service consumer application 302 and service provider application 314, and service consumer application 308 and service provider application 314 may include transmitting a message or invoking a function via an available interface. Services provided and consumed via such communications may include data manipulation at a service consumer application, a service provider application, another application, or a combination thereof.

Communication between service consumer application 302 and service provider application 314 is used as an example to illustrate the operation of the configuration of this figure. Also as an example, the communication between service consumer application 302 and service provider application 314 may conform to SOAP.

Presently, service consumer application 302 may send a SOAP message to service provider application 314 to request a service from service provider application 314. The SOAP message may be formatted according to a predefined data structure for the SOAP message header and a predefined data structure for the SOAP message body.

Presently, service consumer application 302 and service provider application 314 rely on strict conformity to the predefined SOAP data structures to successfully communicate with each other. Service consumer application 302 may populate the SOAP message with those attributes that service provider application 314 expects in a SOAP message. Service provider application 314 may search a SOAP message from service consumer application 302 for those attributes in determining whether and how to provide a service.

Presently, and without the benefit of an embodiment of the invention, the configuration of FIG. 3 suffers from the earlier-described limitations and other shortcomings. For example, service consumer application 302 and service provider application 314 are tightly coupled with each other. As another example, the messaging between service consumer application 302 and service provider application 314 is inflexible in that a change in an attribute of the SOAP message can cause the communication between service consumer application 302 and service provider application 314 to breakdown.

In accordance with an embodiment of the invention, enterprise service bus 320 may be modified to overcome these and other problems existing in similar configurations. According to an embodiment, a mediation component may be implemented in enterprise service bus 320 to perform identity mediation.

Figure 4:
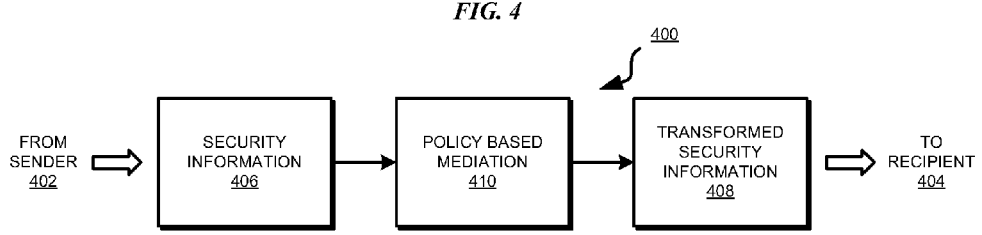
FIG. 4 depicts a block diagram of identity mediation in accordance with an illustrative embodiment.

With reference to FIG. 4, this figure depicts a block diagram of identity mediation in accordance with an illustrative embodiment. Process 400 of identity mediation may be implemented in an enterprise service bus, such as enterprise service bus 320 in FIG. 3.

Identity mediation is the process of mediating or resolving the differences in the identity information, authentication information, authorization information, or another similarly purposed information, collectively called the security information, as sent by one application and as expected by another application. The security information may be associated with an application, or with a user being asserted through the application.

Furthermore, identity mediation may include validation of data, translation of data, transformation of data, addition of data, and deletion of data in a data structure. Additionally, identity mediation may also include addition or manipulation of code or pseudo code in the data structure. Identity mediation may perform these and other similar functions depending on the determination of a policy or outcome of a rule.

In FIG. 4, sender 402 may be a service consumer application, such as service consumer application 302 in FIG. 3. Recipient 404 may be a service provider application, such as service provider application 314 in FIG. 3. Of course, sender 402 and recipient 404 may reverse roles and may be a service provider application and service consumer application respectively within the scope of the invention.

Sender 402 may send security information 406, which may be structured as sender 402, may desire to structure. For example, security information 406 may include a secure token containing data describing identity A. Recipient 404 may expect security information describing a different identity—identity B, or data describing identity A differently than as provided by sender 402. Recipient 404's expected security information may be transformed security information 408.

Policy based mediation 410 may be an identity mediation process performed by an identity mediation component of an enterprise service bus according to an embodiment. Policy based mediation, and identity mediation in general, may include, but may not be limited to, a combination of the following example features.

For example, an embodiment of identity mediation may map a sender-provided authentication credential based on an identity to a valid authentication credential acceptable to the recipient. In one embodiment, the mapping may include mapping the type of credential to another type of credential. For example, from a Security Assertion Markup Language (SAML) token may be mapped to a username token.

In another embodiment, the mapping may include mapping the contents of the credential to different contents or differently formed contents. Some examples of mapping contents may be adding group information to the credentials, and adding or modifying credential attributes.

In another embodiment, the mapping may include mapping a combination of the type and the contents of the sender-provided security information to recipient-acceptable security information. Furthermore, the identity mediation process may utilize security oriented rules or policies in performing the mapping. A rule or a policy may be logic to produce a decision outcome based on a set of inputs. A set of inputs is one or more inputs. The logic of the rule or policy may be implemented in code and may be executed based on events occurring in a given implementation.

An advantage of identity mediation according to an embodiment is that by implementing the identity mediation as a component of an enterprise service bus, the identity mediation may be performed on the internal or private data network. Performing the identity mediation on in a private network may enhance security of the service oriented data communications.

For example, a sender, such as an external service consumer application, may be assigned a dummy identity to use when requesting a service from an internal service provider application. The dummy identity credentials may be unusable to access an internal system or service if asserted. Using the identity mediation of an embodiment, the dummy identity credentials may be mapped to a different identity—one recognized by the internal service or system. Operating in this example manner an embodiment may facilitate decoupling service consumer applications from service provider applications because service consumer applications and service provider applications are each free to use different identities, which can be configured in any manner suitable to the application that uses them. This example manner of operation may also reducing the risk of insider attacks when the service consumer application is also an internal application because only the dummy identity is exposed to the user of the internal service consumer application.

The decoupling of applications according to an illustrative embodiment may increase the flexibility of changes in security setup regarding authentication and authorization. The illustrative embodiments may also enhance service compatibility. For example, authorization attributes are often part of the SOAP message body because those attributes participate in application logic. Without the benefit of an illustrative embodiment, a change in the service definition regarding authorization would presently break the link between service consumer applications and service provider applications. As a result of the identity mediation of an illustrative embodiment, the service continuity can be maintained even when service definition is changed to use modified or different attributes.

Identity mediation according to an illustrative embodiment may also allow the use of a combination of mechanisms for mapping the security information. Furthermore, different mapping mechanisms may be employed for different parts of the security information, at different times, and by different systems or applications.

For example, in one embodiment, some identity attributes of a user in a header of a SOAP message may be mapped at the time the identity mediation component receives the message. The mapping may be performed by executing a policy. Some other attributes may be validated and transformed using a call to a directory server.

Continuing with the example, in another embodiment, the identity mediation component of the enterprise service bus may add information that a service provider application may use downstream to comprehend or transform certain other attributes, such as the credentials of the service consumer application that sent the message. Some credentials may be transformed as needed and when needed to improve performance.

An embodiment may use any source or resource suitable for performing a particular mapping of a part of a given security information. Some example resources that may be used in this manner may be callout to external services such as WS-Trust, XSL transformations, rules and policies databases, lists, specifications, directories and directory servers, and Identity Attribute Server.

Furthermore, an embodiment may map, transform, or otherwise mediate security information independent of transport protocols used for communicating the security information. As attributes in a service change with different versions of the service, an embodiment may support different mappings for different versions of the same service, service consumer application, or service provider application. An embodiment may decouple service consumer applications and service provider applications, thereby increasing implementation flexibility and reducing operating costs. An embodiment may be implemented using an existing enterprise service bus programming model and tools.

Figure 5:
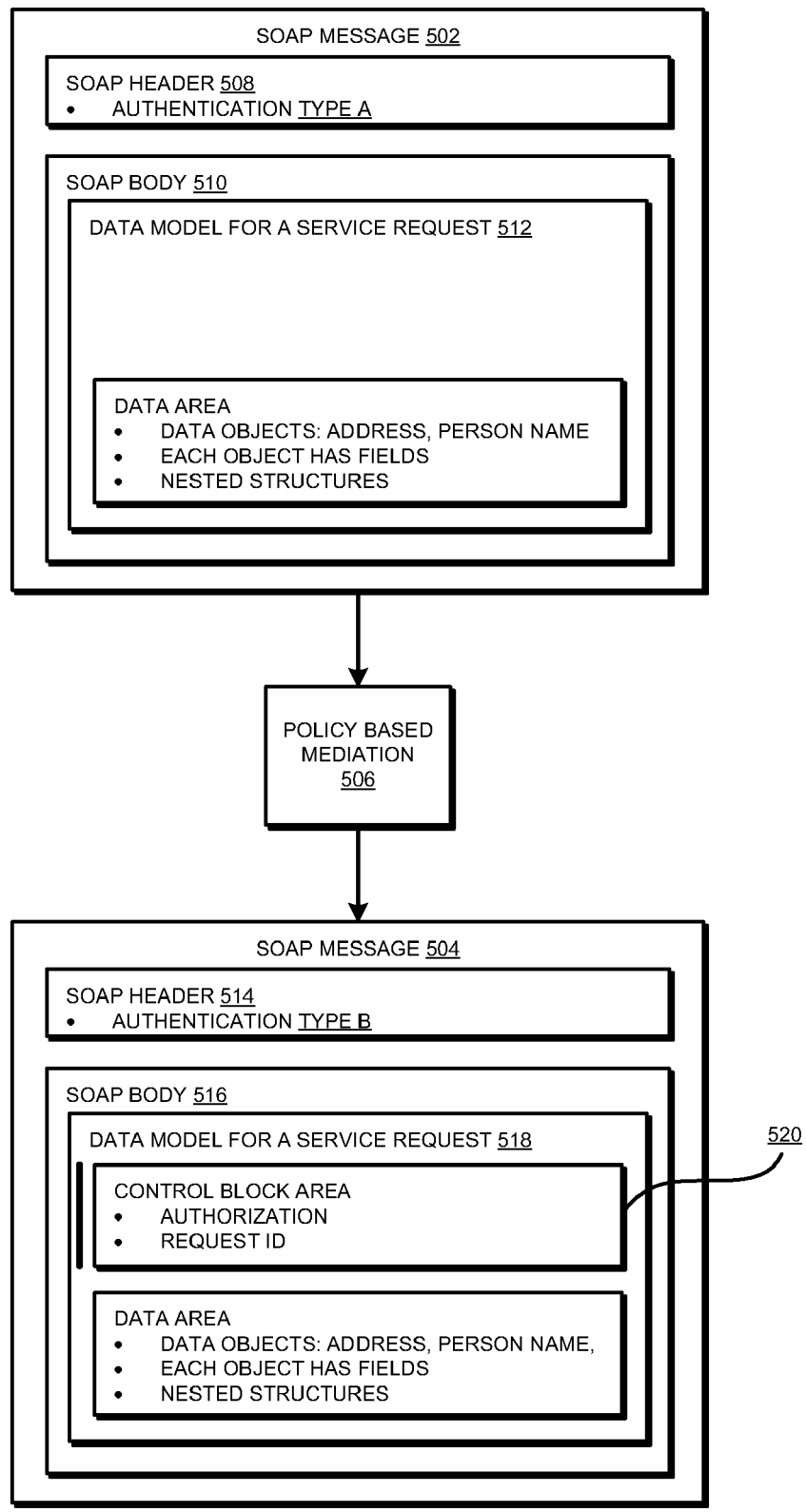
FIG. 5 depicts a block diagram of an example message transformation using identity mediation in accordance with an illustrative embodiment.

With reference to FIG. 5, this figure depicts a block diagram of an example message transformation using identity mediation in accordance with an illustrative embodiment. Message 502 may be similar to or may include security information 406 in FIG. 4. Message 504 may be similar to or may include transformed security information 408 in FIG. 4. Policy based mediation component 506 may be analogous to policy based mediation component 410 in FIG. 4.

SOAP messages are only used in this illustration as an example and are not limiting on the illustrative embodiments. Message 502, as an example, is shown to include header 508 and body 510. Header 508 includes authentication information of a certain example type, Type A. For example, authentication information of Type A may be a SAML token.

Body 510 of message 502 includes data usable for requesting a service from a service provider application. This data may be organized in data structure 512 according to a predetermined definition of data structure 512 as known to a sender of message 502.

Policy based mediation component 506 may execute a policy based identity mediation process using message 502 and generate message 504. The invention recognizes that identifying information, such as for authentication or authorization, may be embedded anywhere in a given message. Accordingly, an embodiment of the invention may be configured to transform the header, the body, the header and the body of a given message within the scope of the invention. An embodiment may transform other parts of a message as well. For example, although rare, a message may include identifying information in the message trailer or the message envelope. An embodiment of the invention may transform the trailer or the envelope as well within the scope of the invention.

Only as examples, certain transformations are depicted in message 504 as resulting from the identity mediation process. For example, authentication information of Type A in header 508 in message 502 may be transformed to authentication information of Type B in header 514 of message 504. For example, authentication information of Type B may be a username token or a certificate.

As another example transformation, data structure 512 may be appended, reduced, changed, or otherwise manipulated into data structure 518 in body 516 of message 504. As an example, data structure is shown to include additional sub-data structure 520 that includes authorization information usable by a recipient of message 504, such as a service provider application.

Note that a sender of message 502 may not have provided at all, or may have provided elsewhere in a different form, the information incorporated into data structure 520. As shown by these example transformations, the illustrative embodiment enables the sender of message 502 and the receiver of message 504 to maintain a lose coupling for communicating with each other. The sender and receiver can each continue to use information, types of information, and organization of information as suits their respective configurations without causing a breakdown of communication between them.

Figure 6:
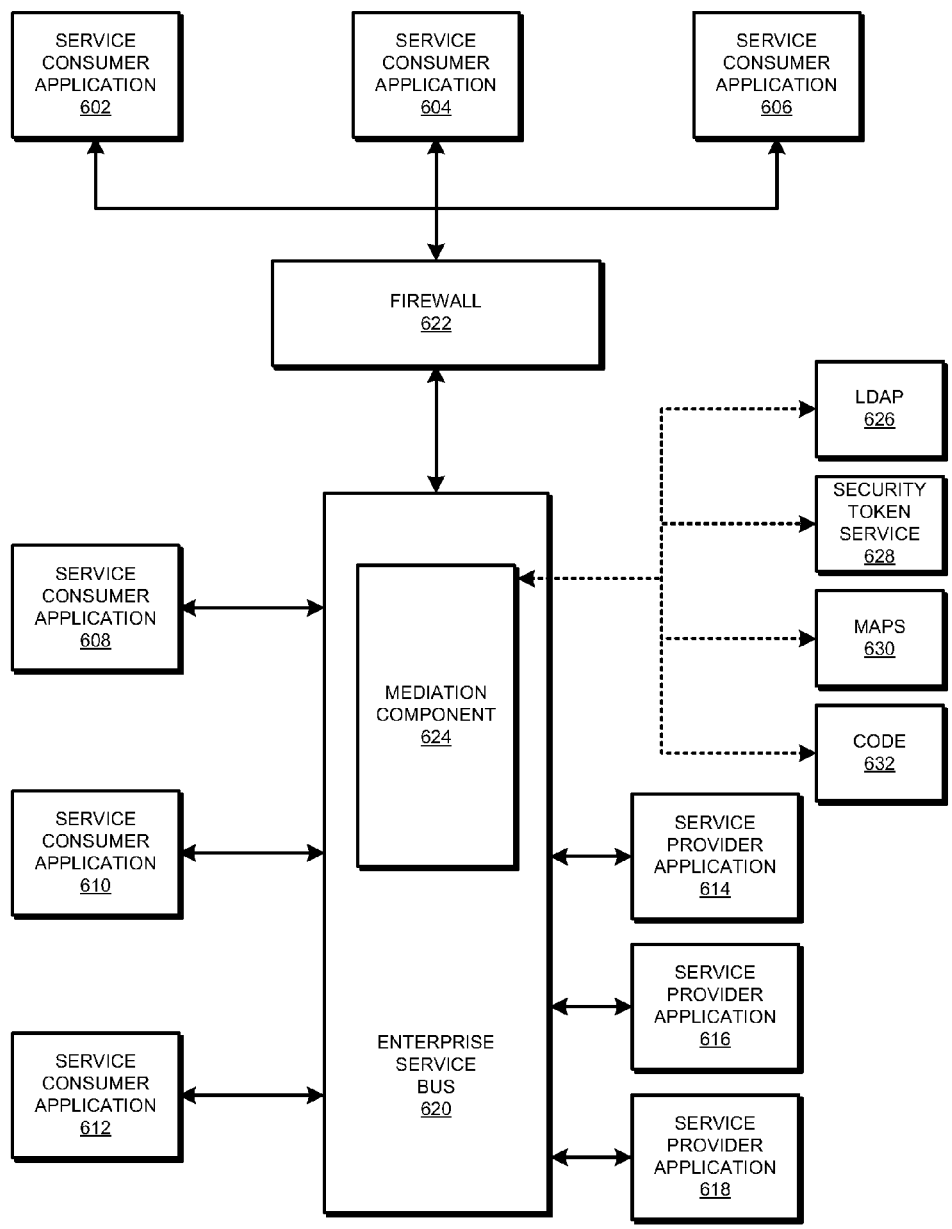
FIG. 6 depicts a configuration of internal and external service consumer and service provider applications using identity mediation in accordance with an illustrative embodiment.

With reference to FIG. 6, this figure depicts a configuration of internal and external service consumer and service provider applications using identity mediation in accordance with an illustrative embodiment. Any of service consumer applications 602, 604, and 606 may be similar to any of service consumer application 302, 304, and 306 in FIG. 3. Any of service consumer application 608, 610, and 612 may be similar to any of service consumer application 308, 310, and 312 in FIG. 3. Any of service provider applications 614, 616, and 618 may be similar to any of service provider application 314, 316, and 318 in FIG. 3. Enterprise service bus 620 may be implemented using enterprise service bus 320 in FIG. 3. Firewall 622 may be similar to firewall 322 in FIG. 3.

Mediation component 624 may be a component of enterprise service bus 620 configured to perform identity mediation according to an embodiment of the invention. For example, mediation component 624 may be configured to perform the identity mediation as described with respect to FIGS. 4 and 5. Generally, mediation component 624 may be configurable to perform any identity mediation according to a particular implementation within the scope of the invention.

In performing identity mediation in a given communication, for example, between service consumer application 602 and service provider application 614, mediation component 624 may utilize one or more resources available in a data processing environment. As some examples, mediation component 624 may communicate with one or more of Lightweight Directory Access Protocol (LDAP) server 626, security token service 628, maps 630 or a storage location thereof, or code 632.

For example, LDAP server 626 may provide information for authenticating a user whose credentials may appear in a message. Security token service 628 may provide validation of an asserted token, or information for transforming token types. Maps 630 may be a collection of mapping information that may provide instructions about manipulating data in a message. Code 632 may be computer executable instructions, algorithms, or pseudo-code for performing computations with the data in a message, implementing rules or policies, or causing events to occur in a data processing system.

The types of resources used in conjunction with mediation component 624 are depicted only as examples and are not limiting on the invention. Of course any number and type of resources may be used in conjunction with mediation component 624 without departing the scope of the invention.

Furthermore, a resource may be accessible to mediation component 624 via enterprise service bus 620 or by using another data communication method without limitation. A resource may be located locally within the data processing system where mediation component 624 executes, or may be accessible over a data network without limitation.

A resource used in conjunction with mediation component 624 may be predetermined or may be identified while processing a message as may be needed. Furthermore, mediation component 624 may interact with more than one resource, or a resource may communicate with another resource, in executing the identity mediation process.

Figure 7:
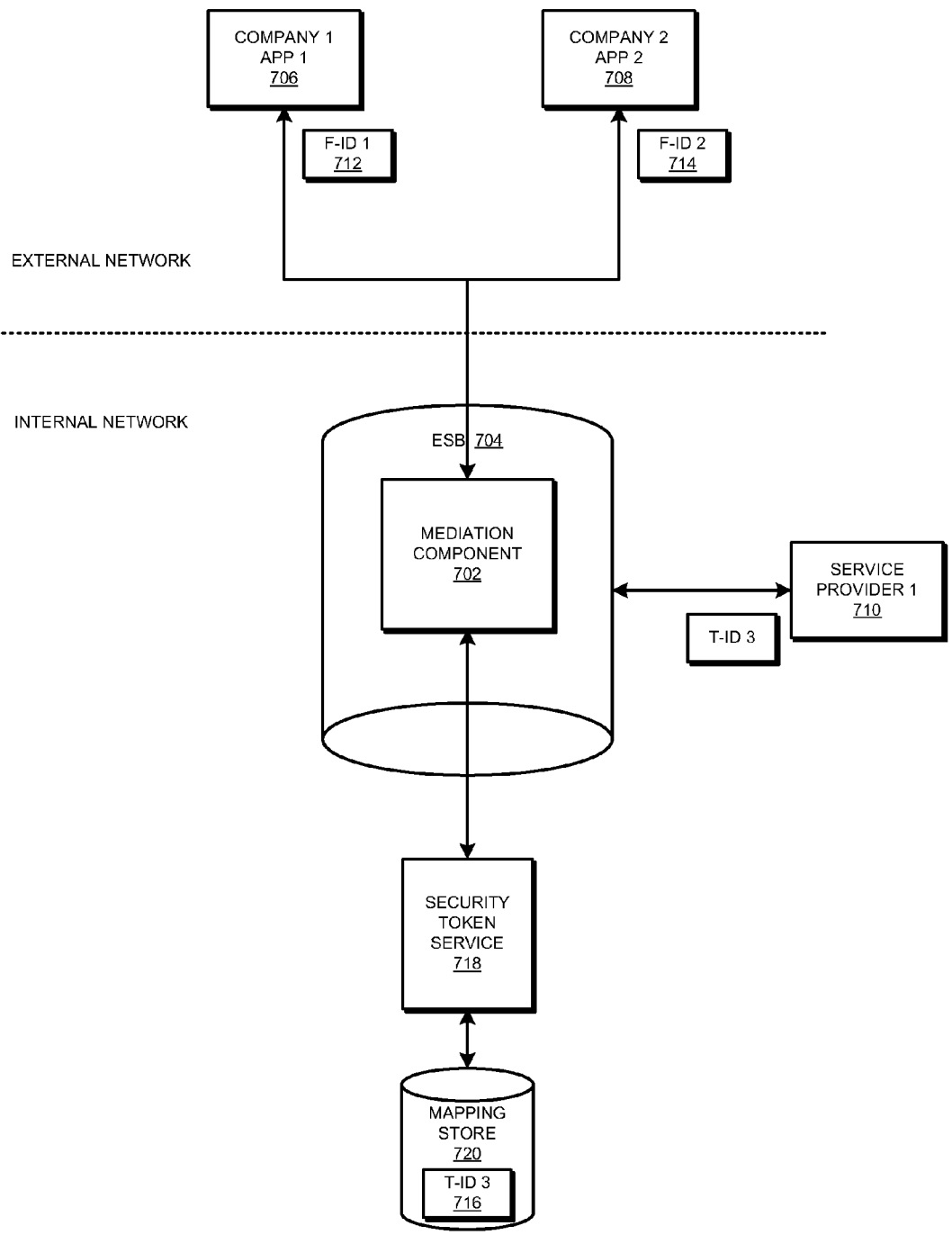
FIG. 7 depicts a block diagram of an example identity mediation execution in accordance with an illustrative embodiment.

With reference to FIG. 7, this figure depicts a block diagram of an example identity mediation execution in accordance with an illustrative embodiment. Mediation component 702 may be analogous to mediation component 624 in FIG. 6. Enterprise service bus 704 may be analogous to enterprise service bus 620 in FIG. 6.

In this example configuration, applications 706 and 708 may be service consumer applications accessible to or executing within external entities, such as Company 1 and Company 2. Application 706 is labeled "Company 1 App. 1" and application 708 is labeled "Company 2 App. 2" to indicate this example scenario.

Applications 706 and 708 may be external consumer applications using a one service provided by service provider application 710 labeled "Service Provider 1". Any suitable communication protocol may be used for interactions between applications 706 and 708 and service provider application 710. As an example, applications 706 and 708 may perform web service interactions with service provider application 710 based on SOAP messages.

An example from the energy provider industry is used to describe the operation of FIG. 7. Company 1 and company 2 could be two different trading partners, for example, energy stock exchanges, suppliers, or buyers, with whom the company that provides a service of service provider application 710, the provider company, is trading units of energy. The service provided could be, for example, a service granting read-only access to the latest price information of units of energy.

In order to trace which external caller requested read access, the provider company may assign different identifiers to each external company, Company 1 and Company 2. Identifiers 712 and 714 labeled "F-ID 1" and "F-ID 2" respectively may represent such identifiers.

Assume the access to the information is read-only and a single identifier with read authorization can suffice for allowing several applications with read-only access. Accordingly, identifier 716 labeled "T-ID 3" for all external participants is created.

Mediation component 702 may, as a part of identity mediation to direct a service request to service provider application 710, determine whether an asserted identifier is mapped to identifier 716 to grant the read-only access. In this example configuration, mediation component 702 may determine whether identifier 712, identifier 714, or both have been mapped to identifier 716 as follows. Company 1 using application 706 and identifier 712 "F-ID 1" requests the service provided by service provider application 710 "Service Provider 1".

Enterprise service bus 704 receives the request and validates that the identifier 712 "F-ID 1" is a valid authentication token. As an example, enterprise service bus 704 may call out to a Secure Token Service via WS-Trust.

If the validation of identifier 712 "FD-1" succeeds, mediation component 702 starts processing and determines that an authentication mapping has to be performed. Mediation component 702 may further determine that the mapping may be done by calling an identity token validation and mapping service. In an example case, mediation component 702 calls out to Security Token Service 718, such as via WS-Trust, to validate the token including identifier 712.

Security Token Service 718 may in turn call mapping store 720 with identifier 712 "F-ID 1". Mapping store returns identifier 716 "T-ID 3" to Security Token service 718. Security Token Service 718 provides identifier 718 "T-ID 3" to mediation component 702 as a suitable mapping for identifier 712.

Mediation component 702 places the authentication credentials for identifier 716 "T-ID 3" into the SOAP message header of the SOAP message send from application 706 to service provider application 710 "Service Provider 1". Mediation component 702 sends identifier 716 "T-ID 3" to service provider application 710 instead of original identifier 712 "F-ID 1" for which an authentication mechanism in service provider application 710 may have failed.

Interactions between Company 2 and the provider company may progress in a similar manner. Application 708 may present identifier 714. Mediation component 702 may map identifier 714 to identifier 716 in a similar manner. Service provider application 710 may authenticate Company 2 using identifier 716 and provide the read-only service to application 708.

Operating in this manner, Company 1 and Company 2 may only know the credentials of identifiers F-ID 1 and F-ID 2 respectively. Credentials of identifiers F-ID 1 and F-ID 2 are not valid in and of themselves to gain access to the provider company's services. Company 1 or Company 2 may not learn the credentials of identifier T-ID 3 that are valid within the provider company, leaving the provider company's internal network secure from spoofing attacks and other types of security breaches.

Figure 8:
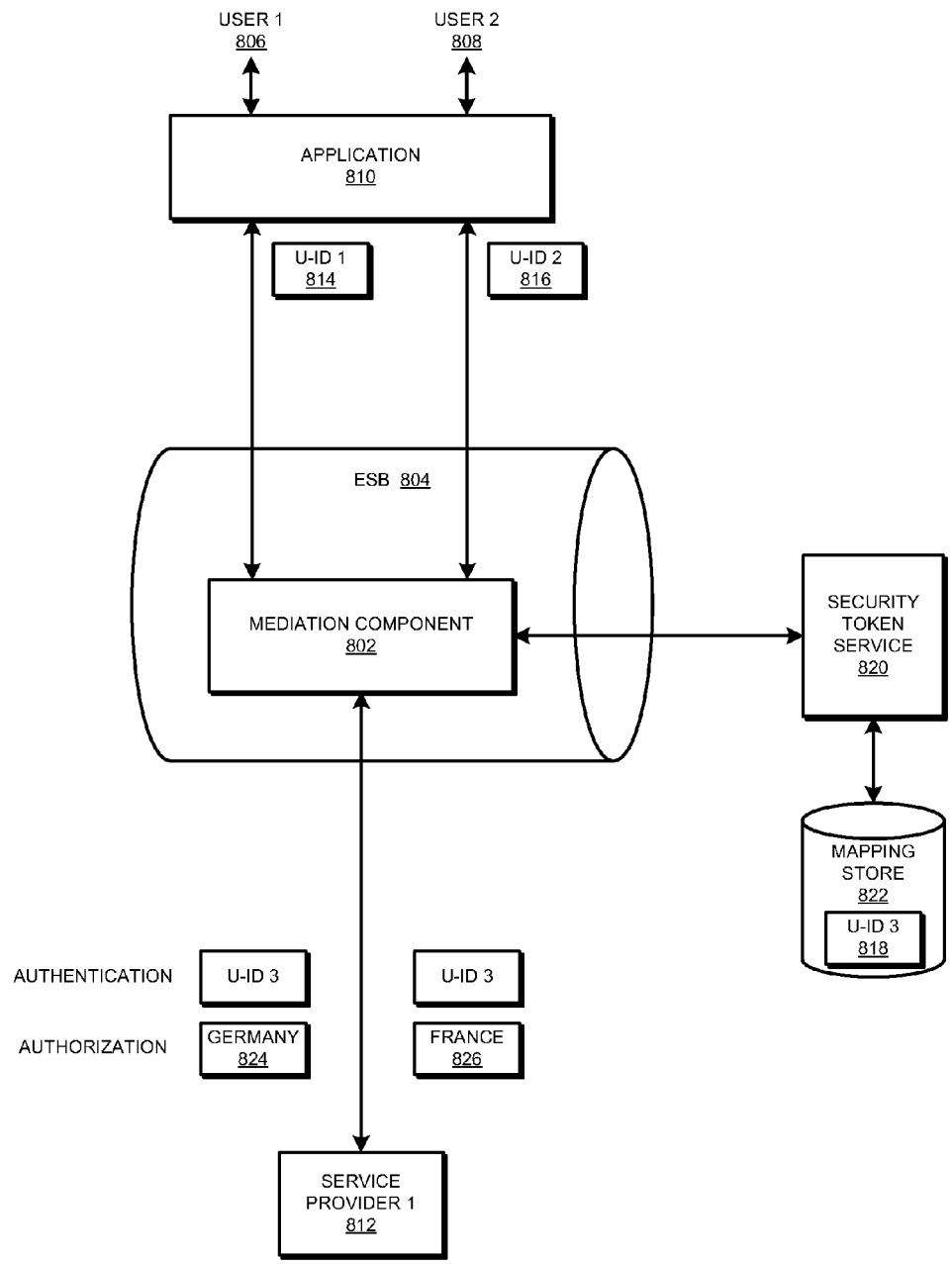
FIG. 8 depicts a block diagram of another example identity mediation execution in accordance with an illustrative embodiment.

With reference to FIG. 8, this figure depicts a block diagram of another example identity mediation execution in accordance with an illustrative embodiment. Mediation component 802 may be analogous to mediation component 702 in FIG. 7. Enterprise service bus 804 may be analogous to enterprise service bus 704 in FIG. 7.

This figure depicts a different example method of operation of an embodiment of the invention. In this example configuration, different users—user 806 "User 1" and user 808 "User 2"—may be using the same application, application 810—a service consumer application. Note that a user within the scope may be a human user or another application or system.

Again, as an example, assume that application 810 uses web service interaction based on SOAP/HTTP messages to request a service from service provider application 812 "Service Provider 1". Again, using an example from the energy provider industry, User 1 and User 2 can be two managers responsible for managing price information for units of energy. The service provided by the service provider application 812 "Service Provider 1" in this example case may allow users 806 and 808 to create, update, and read price information. Each of users 806 and 808 may have a different user identifier for using application 810. User 806 may use identifier 814 "U-ID 1" and user 808 may use identifier 816 "U-ID 2".

According to an embodiment of the invention, mediation component 802 may be configured to allow multiple users to share an identifier. Accordingly, users 806 and 808 may be permitted to share a common identifier for using the service provider application 812. Identifiers 814 and 816 may therefore be mapped to identifier 818 "U-ID 3".

Despite the mapping of identifiers, a caller, such as user 806 or user 808, can still be identified by providing audit functionality in mediation component 802. However, based on the caller's identifier, such as identifier 814 or 816, mediation component 802 may insert different authorization credentials with identifier 818 "U-ID 3" in the transformed message. For example, user 806 corresponding to identifier 814 "U-ID 1" may only be allowed to create, update and read prices for energy units belonging to the energy market in Germany, whereas user 808 corresponding to identifier 816 "U-ID 2" may only be able to work with prices for the market in France.

Insertion of specific authorization attributes into the SOAP body may be accomplished in any manner suitable for a particular implementation. For example, in one embodiment, different template sets of attributes may be used to populate the authorization attributes in a SOAP message body of a SOAP message send over an HTTP protocol. In another embodiment, a Security Token Service may be used to determine the attributes to use in a specific message on a message-by-message basis.

In the example configuration depicted in FIG. 8, mediation component 802 interacts with security token service 820 to identify a suitable transformation for identifiers 814 and 816. Security token service 820 interacts with mapping store 822 and determines that identifiers 814 and 816 can each be mapped to identifier 818.

Mediation component 802 presents identifier 818 "U-ID 3" for authentication to service provider application 812, but with different authorization credentials in each case. As shown in the example configuration, message from user 806 is transformed and presented to have authentication credentials of identifier 818 "U-ID 3" but authorization credentials 824 limiting access to only Germany related data. Similarly, message from user 808 is transformed and presented to have authentication credentials of identifier 818 "U-ID 3" but authorization credentials 826 limiting access to only France related data.

Figure 9:
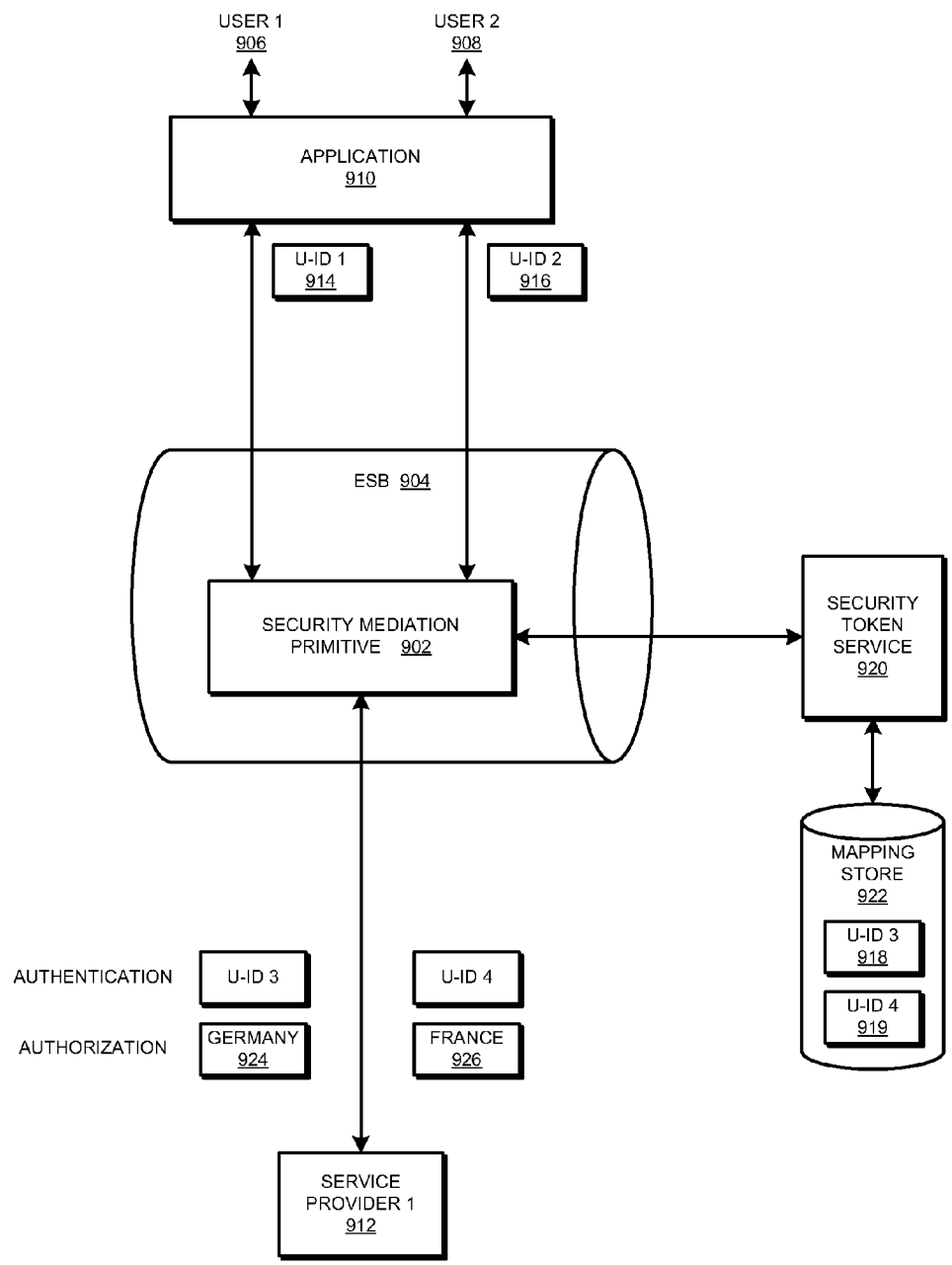
FIG. 9 depicts a block diagram of another example identity mediation execution in accordance with an illustrative embodiment.

With reference to FIG. 9, this figure depicts a block diagram of another example identity mediation execution in accordance with an illustrative embodiment. Mediation component 902 may be similar to mediation component 802 in FIG. 8. Enterprise service bus 904 may be similar to enterprise service bus 804 in FIG. 8.

User 906 "User 1", user 908 "User 2", application 910, service provider application 912 "service provider 1", identifiers 914 and 916, security token service 920, and mapping store 922 operate in a manner similar to their corresponding features depicted in FIG. 8.

This figure depicts a different example method of operation of an embodiment of the invention. in this example method of operation, instead of mapping (dummy) identifiers 914 and 916 to a common (true) identifier on the internal network, identifier 914 may be mapped to identifier 918 "U-ID 3" and identifier 916 may be mapped to identifier 919 "U-ID 4".

Accordingly, mediation component 902 may insert authentication credentials associated with identifier 918 in a message containing identifier 914, and authentication credentials associated with identifier 919 in a message containing identifier 916. As described with respect to FIG. 8, mediation component 902 may also insert same or different authorization credentials in different messages from the same application 910, as suitable for a particular implementation. In the example depicted in FIG. 9, mediation component 902 inserts authorization credentials 924 limiting user 906's access to only Germany related data. Similarly, message from user 908 is transformed and presented to have authentication credentials of identifier 919 "U-ID 4" but authorization credentials 926 limiting access to only France related data.

In one embodiment, mediation component 902 may be configured to transform different security information asserted by application 910 into different authentication credentials, but same authorization attributes. Of example, this configuration could be used for the backup user of user 906 "User 1" so that the backup user may utilize service provider application 912's service with the same authorization as user 906.

The specific example from a specific industry is only used as an example to describe the operation of various embodiments of the invention. Any type of message, type of communication protocol, nature of data, nature of users, or purpose of applications can similarly use an embodiment of the invention within the scope of the invention.

With reference to FIG. 10, this figure depicts a flowchart of a process of mediating security information in accordance with an illustrative embodiment. Process 1000 may be implemented in a mediation component, such as mediation component 902 in FIG. 9.

Process 1000 begins by receiving certain security information (step 1002). For example, the security information received in step 902 may include a single token or multiple tokens, asserting same or different authentication credentials, authorization credentials, or a combination thereof.

Process 1000 identifies a part of the security information to be transformed (step 1004). Process 1000 selects a security policy applicable to the indentified part (step 1006). In one embodiment, more than one part may be identified simultaneously, and more than one policy may be selected for an indentified part of the security information.

Process 1000 transforms the identified part according to the selected policy (step 1008). Process 1000 determines whether more parts of the security information received in step 1002 have to be transformed (step 1010).

If more parts of the security information remain to be transformed ("YES" path of step 1010), process 1000 returns to step 1004. Note that operating in this manner, process 1000 allows different parts of the security information to be transformed using different policies, and at different times during the message handling.

If no more parts of the security information have to be transformed ("NO" path of step 1010), process 1000 sends the transformed security information (step 1012). Process 1000 ends thereafter. In one embodiment, process 1000 may reassemble various transformed parts of the security information before sending in step 1012. Sending in step 1012 may be, for example, sending transformed security information to a service provider application.

With reference to FIG. 11, this figure depicts a flowchart of a process of mediating identities in composite service requests in accordance with an illustrative embodiment. Process 1100 may be implemented in a mediation component, such as mediation component 902 in FIG. 9.

A composite service request is a parent request that includes more than one child service requests. In a composite service request, security information may be included at a global level, to wit, security information applicable at the parent request level, such as to validate the composite request.

The composite service request may further include security information at one or more child service request level. The security information at a child service request level may be similar to or different from the security information at the parent request level or another child service request level. Furthermore, more than one security information may be present at a parent or child level.

In accordance with an illustrative embodiment, process 1100 receives certain security information as a part of a composite service request (step 1102). Process 1100 performs a global level mediation (step 1104).

In performing step 1104, process 1100 may validate, transform, or validate and transform as a part of the mediation process, one or more parts of the security information relating to the parent level request in the composite service request. Furthermore, step 1104 may be performed by entering process 1000 at entry point "A" and exiting at exit point "B" as depicted in FIG. 10.

Process 1100 determines whether the global level mediation was successful (step 1106). A mediation process or step is successful if security information as asserted is determined to be valid, can be transformed according to a policy, or both.

IF the global level mediation is not successful ("NO" path of step 1106), process 1100 may end thereafter. In one embodiment, process 1100 may enter into error detection, error correction, notification, logging, auditing, tracing, or another process upon unsuccessful mediation at the global level.

If the global level mediation is successful ("YES" path of step 1106), process 1100 performs a sub-level, or child level, mediation for a service request in the composite service request (step 1108). In one embodiment, process 1100 may execute step 1108 upon the occurrence or detection of an event. For example, step 1108 may be executed for a particular child service request if another child service request produces a certain result.

Step 1108 may be performed by entering process 1000 at entry point "A" and exiting at exit point "B" as depicted in FIG. 10. Mediation of step 1108 may be successful or unsuccessful in a manner similar to the global mediation being successful or unsuccessful in steps 1104-1106. Additional actions may be configured in an implementation of process 1100 to handle unsuccessful mediation at a sub-level in step 1108 within the scope of the invention.

Process 1100 determines whether more sub-level service requests have to be mediated in the composite service request (step 1110). If no more sub-level service requests have to be mediated in the composite service request ("NO" path of step 1110), process 1100 ends thereafter. If more sub-level service requests have to be mediated in the composite service request ("YES" path of step 1110), process 1100 returns to step 1108.

With reference to FIG. 12, this figure depicts a flowchart of a process of applying security policies in identity mediation in accordance with an illustrative embodiment. Process 1200 may be implemented in a mediation component, such as mediation component 902 in FIG. 9.

Process 1200 begins by identifying a set of security policies applicable to a set of parts of received security information (step 1202). A set of security policies is one or more security policy. A set of parts is one or more parts.

Four example processes are depicted in FIG. 12, and process 1200 may select any one of the four example processes to mediate a part of the security information. A process path begins by applying a set of transformations according to the set of policies (step 1204). In other words, the entire set of policies is applicable to the entire set of transformations. Process 1200 assembles the transformed security information using any transformed parts thereof (step 1206). Process 1200 ends thereafter. An implementation of process 1200 may then send the assembled transformed security information to a recipient, such as a service provider application.

Another alternative process path begins by applying a set of transformations according to a subset of policies (step 1208). Process 1200 receives a result using the transformed security information from step 1208 (step 1210).

Process 1200 determines whether to apply another subset of policies to the security information (step 1212). If another subset of policies should be applied ("YES" path of step 1212), process 1200 returns to step 1208. If another subset of policies should not be applied to the security information ("NO" path of step 1212), process 1200 determines whether another subset of policies should be applied after an event occurs (step 1214).

If another subset of policies should be applied after an event ("YES" path of step 1214), process 1200 returns to step 1208. If another subset of policies should not be applied after an event ("NO" path of step 1214), process 1200 proceeds to step 1206.

Another alternative process path begins by applying a set of transformations according to a subset of policies (step 1216). Process 1200 adds information about other possible transformations to the transformed security information or a part thereof (step 1218). Process 1200 proceeds to step 1206 thereafter.

For example, process 1200 may transform one part of the security information according to a subset of policies, and add information according to another subset of policies in the transformed security information. As another example, process 1200 may transform one part of the security information according to a subset of policies, and add information about another subset of policies that may also be applicable to the transformed security information.

As another example, process 1200 may transform one part of the security information according to a subset of policies, and add information that may be usable by another process to further transform the security information. Steps 1216 and 1218 may be implemented to enable process 1200 to perform any combination of transformation and addition of information within the scope of the invention.

Another alternative process path begins by adding information about possible transformations or applicable security policies (step 1220). Process 1200 proceeds to step 1206 thereafter.

For example, in one embodiment, process 1200 may not transform a part but simply add information about possible transformations so that another process may select an appropriate transformation. As another example, in another embodiment, process 1200 may add information about security policies applicable to a part of the security information such that another process may apply the security policies.

The four alternative process paths are depicted only as examples and are not limiting on the invention. A combination of the four process paths and additional or different process paths may be implemented as suitable in a given implementation and the same are contemplated within the scope of the invention.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, an apparatus, and computer program product are provided in the illustrative embodiments for identity mediation in an enterprise service bus. Using the embodiments of the invention, a mediation component can be implemented using existing tooling of an enterprise service bus. The mediation component according to an embodiment may allow decoupling external applications from internal applications and service consumer applications from service provider applications.

Decoupling or lose coupling afforded by an embodiment may allow implementing different security measures at the service consumer applications and service provider applications without disrupting communication between them. An embodiment of the invention may also allow simultaneously supporting different versions of security information and messaging between versions of similar service consumer applications and service provider applications.

An embodiment may hide and use valid identities within an internal network while exposing only dummy identities not usable inside the internal network without appropriate mediation. An embodiment may allow using and changing security policies in mediating identities according to the requirements of a particular data processing environment in a manner transparent to external applications.

An embodiment of the invention may be implemented as a graphical tool or component of an enterprise service bus. Such a graphical tool or component may enable an operator to configure the identity mediation as opposed to defining configuration files to so configure the mediation process. Furthermore, such a graphical tool or component may enable the operator to monitor the mediation process as opposed to relying on log files or reacting to monitoring messages.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer usable program product comprising a computer usable storage device storing computer usable code for identity mediation in an enterprise service bus, the computer usable code comprising:

computer usable code for receiving a security information from a first application executing in a first data processing system, at the enterprise service bus, the security information being a part of a request for service from a second application executing in a second data processing system, the security information comprising a set of parts, the set of parts including a first subset of parts of the security information and a second subset of parts of the security information;

computer usable code for identifying, in the enterprise service bus, a part of the security information to be transformed such that the part upon transformation is usable for handling the request by the second application;

computer usable code for selecting, in the enterprise service bus, a security policy from a set of security policies applicable to the identified part, wherein the set of security policies is applicable to transform the set of parts of the security information, and wherein a first subset of security policies from the set of security policies is applicable to the first subset of parts of the security information and a second subset of security policies from the set of security policies is applicable to the second subset of parts of the security information;

computer usable code for transforming, using the identity mediation in the enterprise service bus, the identified part according to the security policy, the transforming resulting in a transformed security information; and computer usable code for sending the transformed security information to the second application.

2. The computer usable program product of claim 1, wherein a part in the set of parts in the security information contains information usable for authenticating a sender of the request, and wherein another part in the set of parts in the security information contains information usable for determining authorization of the sender.

3. The computer usable program product of claim 1, wherein the first subset of security policies is applied to the first subset of parts at a first time and the second subset of security policies is applied to the second subset of parts at a second time.

4. The computer usable program product of claim 1, wherein the first subset of security policies is applied to the first subset of parts in the enterprise service bus and the second subset of security policies is applied to the second subset of parts in the second application.

5. The computer usable program product of claim 1, wherein the first subset of security policies is applied to the first subset of parts and information associated with the second subset of security policies is added to the security information.

6. The computer usable program product of claim 1, wherein the request is a composite service request, the composite service request having a first security information at the global level and a second security information at a sub-level.

7. The computer usable program product of claim 6, wherein a transformation of a part of the second security information occurs upon a successful transformation of a part of the first security information.

8. The computer usable program product of claim 7, wherein the transformation of the part of the second security information occurs at the second application.

9. The computer usable program product of claim 1, wherein transforming includes validating, in the enterprise service bus, the part of the security information.

10. The computer usable program product of claim 1, wherein the identity mediation of the identified part security information results in the transformed security information including a common authentication information and a first authorization information when a first sender sends the security information and the common authentication information and a second authorization information when a second sender sends the security information.

11. The computer usable program product of claim 1, wherein the computer usable code is transferred over a network from a remote data processing system, and wherein the transferred computer usable code is stored in a computer readable storage device in a data processing system.

12. The computer usable program product of claim 1, wherein the computer usable code is stored in a computer readable storage device in a server data processing system, and wherein the computer usable code is downloaded over a network from the server data processing system to a remote data processing system for use in a computer readable storage device associated with the remote data processing system.

13. The computer usable program product of claim 1, wherein the enterprise service bus is an Interconnectivity and Interoperability layer.

14. The computer usable program product of claim 1, wherein the identity mediation includes manipulating code associated with the security information.

15. A data processing system for identity mediation in an enterprise service bus, the data processing system comprising:

a storage device, wherein the storage device stores computer usable program code; and a processor, wherein the processor executes the computer usable program code, and wherein the computer usable program code comprises:

computer usable code for receiving a security information from a first application executing in a first data processing system, at the enterprise service bus, the security information being a part of a request for service from a second application executing in a second data processing system, the security information comprising a set of parts, the set of parts including a first subset of parts of the security information and a second subset of parts of the security information;

computer usable code for identifying, in the enterprise service bus, a part of the security information to be transformed such that the part upon transformation is usable for handling the request by the second application;

computer usable code for selecting, in the enterprise service bus, a security policy from a set of security policies applicable to the identified part, wherein the set of security policies is applicable to transform the set of parts of the security information, and wherein a first subset of security policies from the set of security policies is applicable to the first subset of parts of the security information and a second subset of security policies from the set of security policies is applicable to the second subset of parts of the security information;

computer usable code for transforming, using the identity mediation in the enterprise service bus, the identified part according to the security policy, the transforming resulting in a transformed security information; and computer usable code for sending the transformed security information to the second application.

* * * * *